United States Patent
Smith et al.

(10) Patent No.: US 11,722,542 B2
(45) Date of Patent: Aug. 8, 2023

(54) FRAME-ACCURATE VIDEO SEEKING VIA WEB BROWSERS

(71) Applicant: DISNEY ENTERPRISES, INC., Burbank, CA (US)

(72) Inventors: Colin Smith, Vancouver (CA); Scott A. Erickson, Glendale, CA (US); Giovanni Colombo, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 79 days.

(21) Appl. No.: 17/468,097

(22) Filed: Sep. 7, 2021

(65) Prior Publication Data

US 2021/0409473 A1    Dec. 30, 2021

Related U.S. Application Data

(62) Division of application No. 15/655,827, filed on Jul. 20, 2017, now Pat. No. 11,146,608.

(51) Int. Cl.
*H04L 65/75* (2022.01)
*H04N 19/196* (2014.01)
(Continued)

(52) U.S. Cl.
CPC ............ *H04L 65/762* (2022.05); *H04L 65/70* (2022.05); *H04N 19/154* (2014.11);
(Continued)

(58) Field of Classification Search
CPC ......... H04N 21/4782; H04N 21/25808; H04N 21/2393; H04N 21/23439;
(Continued)

(56) References Cited

U.S. PATENT DOCUMENTS

| 5,784,527 A * | 7/1998 | Ort | H04N 5/945 |
| | | | 386/E5.036 |
| 6,693,959 B1 * | 2/2004 | Eckart | G11B 27/105 |
| | | | 386/E5.009 |

(Continued)

FOREIGN PATENT DOCUMENTS

| CN | 106686445 A | * | 5/2017 | |
| CN | 111294592 A | * | 6/2020 | ............ H04N 19/11 |

(Continued)

*Primary Examiner* — James R Sheleheda
(74) *Attorney, Agent, or Firm* — Artegis Law Group, LLP

(57) ABSTRACT

Various embodiments of the invention disclosed herein provide techniques for frame-accurate navigation of a media file. A multi-pass encoding application executing on a media content server encodes a set of file-based images associated with a media file using a first set of encoding parameters to generate a first encoded media file. The multi-pass encoding application encodes the first encoded media file using a second set of encoding parameters to generate a second encoded media file. The first encoded media file and second encoded media file are stored on the media content server and/or or other media content servers. Content delivery applications executing on these media content servers receive a request associated with the media file from a web browsing application, determine a type of the web browsing application, and transmit either the first encoded media file or the second encoded media file based on the type of web browsing application.

20 Claims, 5 Drawing Sheets

(51) Int. Cl.
  *H04N 19/177* (2014.01)
  *H04N 19/154* (2014.01)
  *H04N 19/162* (2014.01)
  *H04N 21/4782* (2011.01)
  *H04N 21/258* (2011.01)
  *H04N 21/2343* (2011.01)
  *H04N 21/239* (2011.01)
  *H04L 65/70* (2022.01)
  *H04L 67/02* (2022.01)

(52) U.S. Cl.
  CPC ......... *H04N 19/162* (2014.11); *H04N 19/177* (2014.11); *H04N 19/196* (2014.11); *H04N 21/2393* (2013.01); *H04N 21/23439* (2013.01); *H04N 21/234309* (2013.01); *H04N 21/25808* (2013.01); *H04N 21/4782* (2013.01); *H04L 67/02* (2013.01)

(58) Field of Classification Search
  CPC ......... H04N 21/234309; H04N 19/177; H04N 19/162; H04N 19/196; H04N 19/154; H04L 65/762; H04L 65/70
  See application file for complete search history.

(56) References Cited

U.S. PATENT DOCUMENTS

| | | | | |
|---|---|---|---|---|
| 7,142,775 | B2 * | 11/2006 | Sullivan | G11B 27/3036 375/E7.278 |
| 7,243,363 | B1 * | 7/2007 | Ohba | A63F 13/12 463/31 |
| 7,298,417 | B2 * | 11/2007 | Sakaniwa | H04N 7/01 348/E7.003 |
| 7,738,550 | B2 | 6/2010 | Kuhn | |
| 7,844,002 | B2 | 11/2010 | Lu et al. | |
| 8,843,589 | B2 | 9/2014 | Shapiro | |
| 9,338,467 | B1 | 5/2016 | Gadepalli et al. | |
| 10,085,047 | B2 | 9/2018 | Hasek | |
| 10,271,074 | B2 | 4/2019 | Henaire et al. | |
| 10,326,815 | B2 | 6/2019 | Chalmers et al. | |
| 10,708,581 | B2 * | 7/2020 | Ai | H04N 19/46 |
| 11,315,606 | B1 * | 4/2022 | Montgomery | G11B 27/022 |
| 2002/0089602 | A1 * | 7/2002 | Sullivan | H04N 21/23608 375/E7.278 |
| 2002/0116361 | A1 * | 8/2002 | Sullivan | H04N 21/8547 |
| 2003/0093801 | A1 * | 5/2003 | Lin | H04N 21/6587 386/E5.052 |
| 2004/0041943 | A1 * | 3/2004 | Fecht | G11B 27/034 348/E5.049 |
| 2004/0098463 | A1 | 5/2004 | Shen et al. | |
| 2005/0111835 | A1 | 5/2005 | Friel et al. | |
| 2006/0078291 | A1 * | 4/2006 | Sullivan | H04N 21/8547 375/E7.278 |
| 2006/0140591 | A1 | 6/2006 | Estevez et al. | |
| 2006/0224762 | A1 | 10/2006 | Tian et al. | |
| 2008/0235742 | A1 * | 9/2008 | Osaki | H04N 21/2387 725/100 |
| 2009/0083279 | A1 | 3/2009 | Hasek | |
| 2010/0045856 | A1 | 2/2010 | Chappalli et al. | |
| 2010/0150223 | A1 | 6/2010 | Nagaraj et al. | |
| 2010/0158126 | A1 | 6/2010 | Bai et al. | |
| 2011/0173345 | A1 | 7/2011 | Knox et al. | |
| 2011/0292996 | A1 | 12/2011 | Jayant et al. | |
| 2012/0124123 | A1 | 5/2012 | Pierce et al. | |
| 2012/0155833 | A1 * | 6/2012 | Narayanan | H04N 19/70 386/E5.028 |
| 2013/0117418 | A1 | 5/2013 | Mutton et al. | |
| 2013/0166580 | A1 | 6/2013 | Maharajh et al. | |
| 2014/0037005 | A1 | 2/2014 | Lee et al. | |
| 2014/0115090 | A1 | 4/2014 | Hasek | |
| 2015/0058452 | A1 | 2/2015 | Liu et al. | |
| 2015/0100667 | A1 | 4/2015 | Freyria et al. | |
| 2015/0104153 | A1 | 4/2015 | Braness et al. | |
| 2015/0179224 | A1 * | 6/2015 | Bloch | H04N 21/2387 386/241 |
| 2015/0189018 | A1 | 7/2015 | Cassidy et al. | |
| 2015/0208079 | A1 | 7/2015 | Pore et al. | |
| 2015/0222938 | A1 | 8/2015 | Hasek | |
| 2015/0229941 | A1 | 8/2015 | Nakano et al. | |
| 2015/0230002 | A1 | 8/2015 | Brockmann et al. | |
| 2015/0296274 | A1 | 10/2015 | Good et al. | |
| 2015/0371613 | A1 | 12/2015 | Patel et al. | |
| 2015/0373328 | A1 | 12/2015 | Yenneti et al. | |
| 2016/0005439 | A1 * | 1/2016 | Stark | H04N 21/242 386/201 |
| 2016/0127614 | A1 * | 5/2016 | Molnar | H04N 5/06 386/207 |
| 2016/0127679 | A1 | 5/2016 | Guiu | |
| 2016/0198166 | A1 | 7/2016 | Kudana et al. | |
| 2016/0249079 | A1 | 8/2016 | Malone et al. | |
| 2016/0337680 | A1 | 11/2016 | Kalagi et al. | |
| 2017/0078358 | A1 | 3/2017 | Corley et al. | |
| 2017/0078666 | A1 | 3/2017 | Schwartz et al. | |
| 2017/0078687 | A1 | 3/2017 | Coward et al. | |
| 2017/0142166 | A1 | 5/2017 | Lawson et al. | |
| 2017/0150166 | A1 | 5/2017 | Sethuraman | |
| 2017/0201761 | A1 | 7/2017 | Walker et al. | |
| 2017/0208328 | A1 | 7/2017 | Kuusela | |
| 2017/0244988 | A1 | 8/2017 | Hasek | |
| 2017/0302981 | A1 | 10/2017 | Sethuraman et al. | |
| 2017/0353743 | A1 | 12/2017 | Oyman | |
| 2017/0359601 | A1 * | 12/2017 | Sievers | H04N 9/8205 |
| 2018/0124146 | A1 | 5/2018 | Chen et al. | |
| 2018/0139480 | A1 | 5/2018 | Tai et al. | |
| 2018/0184089 | A1 | 6/2018 | Zhang et al. | |
| 2018/0192086 | A1 | 7/2018 | Henaire et al. | |
| 2018/0196690 | A1 | 7/2018 | Gabrielson et al. | |
| 2018/0213226 | A1 | 7/2018 | Lewis et al. | |
| 2018/0270515 | A1 | 9/2018 | Ramaswamy et al. | |
| 2018/0295174 | A1 | 10/2018 | Brueck et al. | |
| 2018/0310032 | A1 | 10/2018 | Reitmeyer et al. | |
| 2018/0316949 | A1 | 11/2018 | Banerjee | |
| 2018/0324235 | A1 | 11/2018 | Mufti | |
| 2018/0332324 | A1 | 11/2018 | Mutton | |
| 2018/0338146 | A1 | 11/2018 | John | |
| 2018/0338166 | A1 | 11/2018 | Amiga et al. | |
| 2018/0359505 | A1 | 12/2018 | Hurst | |
| 2018/0367799 | A1 | 12/2018 | Carmel et al. | |
| 2018/0376153 | A1 | 12/2018 | Gokhale et al. | |
| 2019/0014165 | A1 | 1/2019 | Stockhammer et al. | |
| 2019/0028527 | A1 | 1/2019 | Smith et al. | |
| 2019/0090090 | A1 | 3/2019 | Asif et al. | |
| 2019/0158856 | A1 | 5/2019 | Kopietz | |
| 2019/0182488 | A1 | 6/2019 | Owen | |
| 2019/0182518 | A1 | 6/2019 | Mittal et al. | |
| 2019/0200079 | A1 | 6/2019 | Mathur et al. | |
| 2019/0311747 | A1 * | 10/2019 | Boonmee | H04N 21/44008 |
| 2020/0099954 | A1 * | 3/2020 | Hemmer | H04N 19/186 |
| 2020/0404290 | A1 | 12/2020 | Huang et al. | |

FOREIGN PATENT DOCUMENTS

| | | | | |
|---|---|---|---|---|
| CN | 115171241 A | * | 10/2022 | |
| EP | 1667460 A2 | | 6/2006 | |
| EP | 1177691 B1 | | 1/2011 | |
| JP | 2003061041 A | * | 2/2003 | ........... G11B 27/034 |
| JP | 2004312059 A | * | 11/2004 | |
| JP | 3706721 B2 | * | 10/2005 | ........... G11B 27/036 |
| JP | 2007250048 A | * | 9/2007 | |

* cited by examiner

FRAME-ACCURATE VIDEO SEEKING VIA WEB BROWSERS

CROSS-REFERENCE TO RELATED APPLICATIONS

This application is a divisional of the co-pending U.S. patent application titled, "FRAME-ACCURATE VIDEO SEEKING VIA WEB BROWSERS," filed on Jul. 20, 2017 and having Ser. No. 15/655,827. The subject matter of this related application is hereby incorporated herein by reference.

BACKGROUND OF THE INVENTION

Field of the Invention

The present invention relates generally to delivering media content over computer networks and, more specifically, to frame-accurate video seeking via web browsers.

Description of the Related Art

As the capabilities and capacities of computer networks and computing devices has increased over time, so too has the ability of such computer networks and computer devices to deliver rich media content in various digital formats over the internet via content delivery websites. References movies are a particular form of rich media content that are produced in conjunction with the process of making live action and animated films. In general, reference movies are video clips of a short duration, ranging in length from a few seconds to a view minutes. Reference movies typically have a constant frame rate and a lower resolution than the final film, and may and may include an audio track. Typically, each video frame of the reference movie is identified by a source identifier and a frame number that is "burned in" or otherwise superimposed onto the video frame. Such reference movies are employed for various processes and workflows during the making of a film. As such, reference movies are specifically formatted to support various processes employed by professionals during the making of a film, as opposed to being formatted for viewing by consumers. For example, reference movies could be employed to select portions of the film for publicity purposes, such as including specific portions of a file in a film trailer. Further, designated members of the film production team employ reference movies to perform directorial and technical reviews. Subsequent to such reviews, members of the film production team may identify certain portions of the film that need to be changed as a result. In general, such uses of reference movies require frame-accurate navigation to any frame within the reference movie in order to accurately identify an exact starting and ending video frame of the relevant portion of the reference movie. As with other forms of rich media content, reference movies that are in an appropriate digital format are accessible via the internet.

In that regard, hypertext markup language version 5 (HTML5) is a commonly used standard for delivering video content over the internet. With HTML5, an end-user device transmits a request for a particular media content item via a web browser, a video player application, or an application programming interface (API). In response, a content server that stores the media content item retrieves the media content item and begins transmitting media data, such as video packets and audio packets, that make up the media content item to the client device. As the client device receives the media data, the client device buffers the individual video packets included in the media data and decodes the video packets and audio packets into a sequence of video frames with accompanying audio. The client device then successively displays the decoded video frames on an associated display and transmits the accompanying audio to one or more audio devices, such as speakers or headphones. Typically, as each successive video frame is displayed by the client device, previous video frames that have already been displayed are discarded.

One drawback of accessing reference movies over the internet via a web browser is that the video playback mechanisms in web browsers are typically optimized for video streaming, but cannot accurately navigate to specific frames in a reference movie. In particular, a media content item that has been encoded into a video file usually includes three types of video frames known as intra-coded frames (I-frames), predicted frames (P-frames), and bi-directional predicted frames (B-frames). P-frames and B-frames are encoded using information from other video frames, while I-frames are encoded without using information from other video frames. Typically, web browsers are configured to navigate only to I-frames, not to P-frames or B-frames, and are configured to navigate only to I-frames that are still in memory and have not been discarded. However, in a typical video file, I-frames generally appear once every eight frames or appear with even less frequency. Thus, in common implementations, web browsers can navigate only to every eighth frame in a video file of a reference movie, and only if that I-frame has not yet been discarded. Further, most video playback mechanisms in web browsers can navigate only in the forward direction, not the backward direction. As a result, such video playback mechanisms are typically limited to navigating in the forward direction, and only to every eighth frame. Therefore, these video playback mechanisms are generally unable to step frame-by-frame through a video file in either the forward direction or the backward direction.

Because of these deficiencies, viewers of reference movies via web browsers are generally unable to accurately identify specific video frames of interest within a video file of a reference movie.

As the foregoing illustrates, what is needed in the art are more effective ways to view reference movies via web browsers.

SUMMARY OF THE INVENTION

Various embodiments of the present application set forth a computer-implemented method for encoding a first set of file-based images associated with a first media file. The method includes encoding the first set of file-based images using a first set of encoding parameters to generate a first encoded media file. The method further includes encoding the first encoded media file using a second set of encoding parameters to generate a second encoded media file. The method further provides that the first encoded media file and the second encoded media file are stored on a media content server that receives a request associated with the first set of file-based images from a web browsing application, determines a type of the web browsing application, and transmits one of the first encoded media file and the second encoded media file based on the type of web browsing application.

Various embodiments of the present application set forth a computer-implemented method for navigation of a media file. The method includes receiving, from a web browsing application, a first frame number of a target video frame associated with the media file. The method further includes incrementing the first frame number by a predetermined value associated with an amount of time between two consecutive video frames in the media file to determine a second frame number. The method further includes converting the second frame number into a first time code. The method further includes accessing the target video frame based on the first time code.

Other embodiments of the present invention include, without limitation, a computer-readable medium including instructions for performing one or more aspects of the disclosed techniques, as well as a computing device for performing one or more aspects of the disclosed techniques.

At least one advantage of the disclosed techniques is that they enable reference movies to be accessed via standard web browsers in a frame-accurate manner. Among other things, with the disclosed techniques, users can navigate to a specific frame in a reference movie and can step forward or backward one frame at a time until a particular frame of interest is identified. As a result, portions of a reference movie can be identified more easily and accurately for publicity purposes or in order to correct directorial or technical issues.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
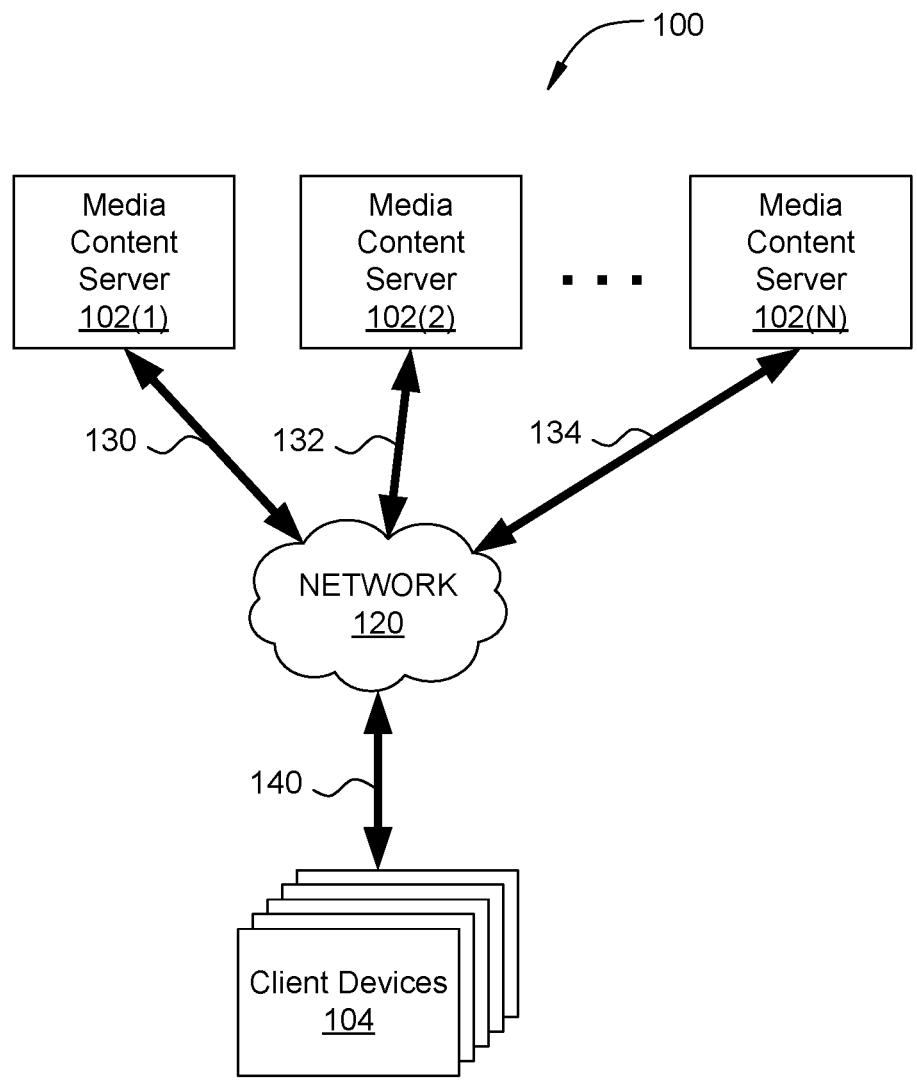
FIG. 1 illustrates a system configured to implement one or more aspects of the present invention.

FIG. 1 illustrates a system 100 configured to implement one or more aspects of the present invention. As shown, the system includes, without limitation, media content servers 102(1), 102(2), . . . 102(N) and client devices 104 in communication with each other via a network 120. Network 120 may be any suitable environment to enable communications among remote or local computer systems, including, without limitation, cross connect systems within a data center, dedicated low-latency networks, LANs (Local Area Networks), and internet-based WANs (Wide Area Networks).

Each of client devices 104 includes a computing device that may be a personal computer, video game console, personal digital assistant, mobile phone, mobile device, or any other device suitable for implementing one or more aspects of the present invention. Illustratively, client devices 104 communicate over network 120 via communications link 140. Client devices 104 transmit network messages that include requests for specific content from one or more of media content servers 102(1), 102(2), . . . 102(N). Upon receiving the requested content from media content servers 102(1), 102(2), . . . 102(N), client devices 104 perform further processing on the requested content, including, without limitation, analyzing the requested content and displaying the requested content on a display device.

Each of media content servers 102(1), 102(2), . . . 102(N) includes a computing device that may be a standalone server, a cluster or "farm" of servers, one or more network appliances, or any other device suitable for implementing one or more aspects of the present invention. Media content servers 102(1), 102(2), . . . 102(N) communicate with client devices 104 via communications links 130, 132, and 134, respectively. Communications links 130, 132, and 134 may be any technically feasible communication channel, including, without limitation, point-to-point communications channels, one or more LANs, and one or more internet-based WANs. In general, each of media content servers 102(1), 102(2), . . . 102(N) is configured to receive and service requests from multiple client devices 104. In response to receiving network messages that include requests for specific content, media content servers 102(1), 102(2), . . . 102(N) retrieve and transmit network messages that include the requested content to client devices 104 via communications links 130, 132, and 134, respectively.

Frame-Accurate Reference Movie Access Via Web Browsers

Figure 2:
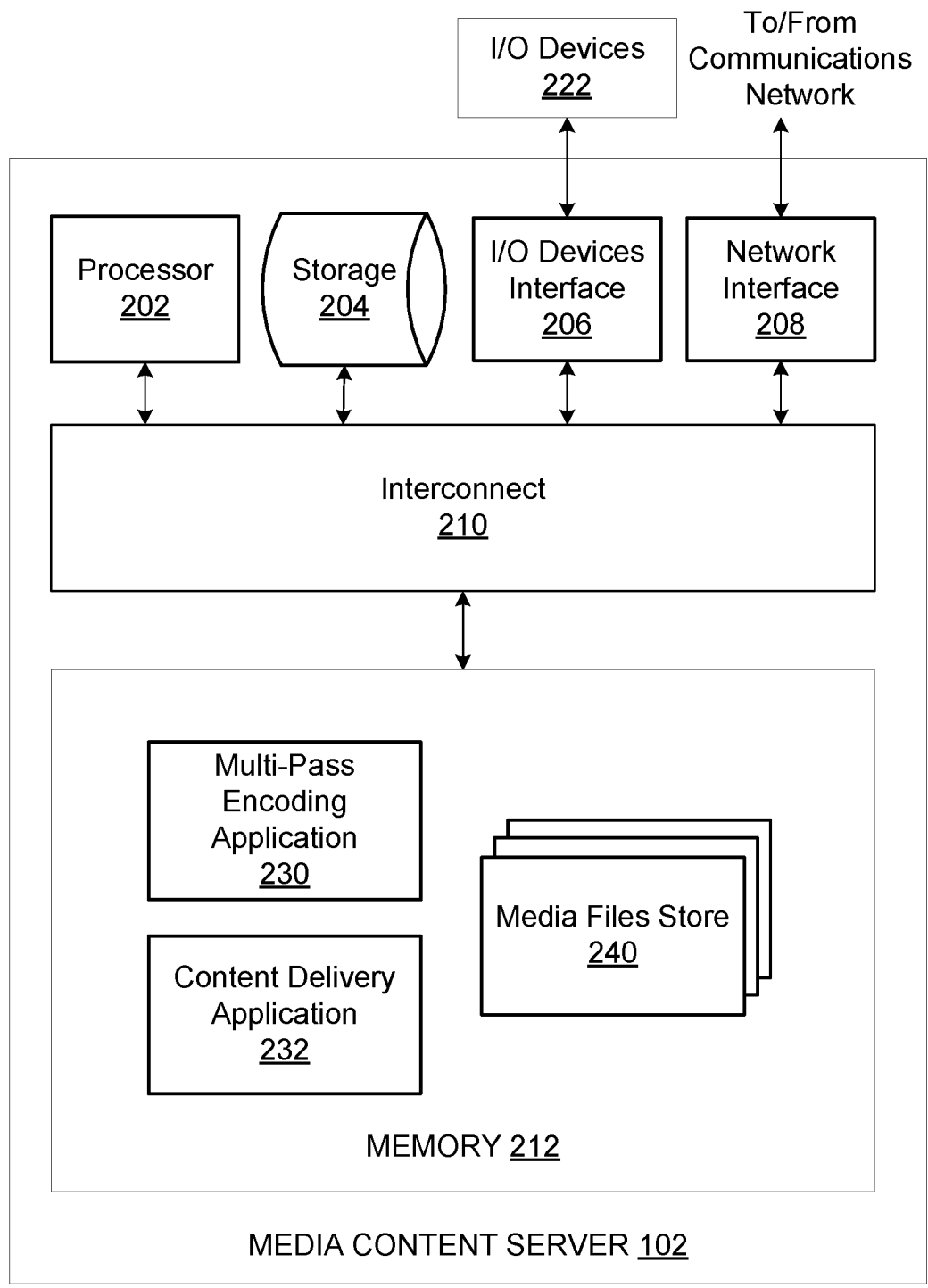
FIG. 2 is a more detailed illustration of the media content server of FIG. 1, according to various embodiments of the present invention.

FIG. 2 is a more detailed illustration of the media content server 102 of FIG. 1, according to various embodiments of the present invention. As shown, the media content server 102 includes, without limitation, a processor 202, storage 204, an input/output (I/O) devices interface 206, a network interface 208, an interconnect 210, and a system memory 212.

The processor 202 retrieves and executes programming instructions stored in the system memory 212. Similarly, the processor 202 stores and retrieves application data residing in the system memory 212. The interconnect 210 facilitates transmission, such as of programming instructions and application data, between the processor 202, input/output (I/O) devices interface 206, storage 204, network interface 208, and system memory 212. The I/O devices interface 206 is configured to receive input data from user I/O devices 222. Examples of user I/O devices 222 may include one of more buttons, a keyboard, and a mouse or other pointing device. The I/O devices interface 206 may also include an audio output unit configured to generate an electrical audio output signal, and user I/O devices 222 may further include a speaker configured to generate an acoustic output in response to the electrical audio output signal. Another example of a user I/O device 222 is a display device that generally represents any technically feasible means for generating an image for display. For example, the display device could be a liquid crystal display (LCD) display, CRT display, or DLP display. The display device may be a TV that includes a broadcast or cable tuner for receiving digital or analog television signals.

Processor 202 is included to be representative of a single central processing unit (CPU), multiple CPUs, a single CPU having multiple processing cores, and the like. And the system memory 212 is generally included to be representative of a random access memory. The storage 204 may be a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN). Processor 202 communicates to other computing devices and systems via network interface 208, where network interface 208 is configured to transmit and receive data via a communications network.

The system memory 212 includes, without limitation, a multi-pass encoding application 230, a content delivery application 232, and media files store 240. The multi-pass encoding application 230, when executed by the processor 202, performs one or more operations associated with encoding a set of file-based images associated with an uncompressed media file for the media content server 102 of FIG. 1, as further described herein. The content delivery application 232, when executed by the processor 202, performs one or more operations associated with downloading the encoded media files to client devices on behalf of the media content server 102 of FIG. 1, as also further described herein. Media files store 240 includes uncompressed media files and encoded media files, in any combination. As used herein, uncompressed media files and encoded media files may include any one or more technically feasible media types in any combination, including, without limitation, video data, audio data, and image data. In general, uncompressed media files and encoded media files may also be stored in storage 204, and may be transferred between storage 204 and media files store 240. In this manner, a particular uncompressed media file or encoded media file may be stored only in storage 204, only in media files store 240, or in both storage 204 and media files store 240.

In operation, the multi-pass encoding application 230 retrieves an uncompressed media file from either storage 204 or media files store 240. The uncompressed media file may be in uncompressed red-green-blue (RGB) format. In some embodiments, the uncompressed media file includes a reference movie, where portions of the reference movie may be selected for publicity purposes or identified as needing correction as a result of directorial and technical reviews. The multi-pass encoding application 230 retrieves the uncompressed media file in response to any technically feasible stimulus, including, without limitation, receiving a command from a user to encode an uncompressed media file, receiving a command from another application to encode an uncompressed media file via an API, and detecting that a new uncompressed media file has been placed into a particular directory in storage 204 or media files store 240. After retrieving the uncompressed media file, the multi-pass encoding application 230 encodes the uncompressed media file into two encoded media files.

The multi-pass encoding application 230 encodes the set of file-based images associated with the uncompressed media file via a one-pass operation to generate a first encoded media file. The first encoded media file is compatible with frame-accurate playback and navigation via a first set of web browsers, also referred to herein as a web browsing application. To achieve frame-accurate playback and navigation, the first encoded media file is encoded according to a first set of encoding parameters. The first set of encoding parameters is selected to generate a first encoded media file that includes a sufficient number of I-frames for frame-accuracy, while maintaining an acceptable level of visual quality and data transfer speed. Further, the first set of encoding parameters is selected to generate a first encoded media file that has a constant frame rate. In some embodiments, the first encoded media file may be generated by invoking the command shown below:

| | |
|---|---|
| 10 | ffmpeg \ |
| 20 | -i <images input frames> \ |
| 30 | -i <audio input file> \ |
| 40 | -r 24 \ |
| 50 | -vcodec h264 \ |
| 60 | -pix_fmt yuv420p \ |
| 70 | -strict -2 \ |
| 80 | -g 8 \ |
| 90 | -movflags faststart \ |
| 100 | <output.mp4> |

Line 10 invokes a motion picture experts group (MPEG) based encoder, such as a variant of the FFmpeg encoder. Line 20 species the file name of the uncompressed media file that includes image input frames to be encoded into the first encoded media file. Line 30 specifies the file name of an optional audio input file that includes audio data associated with the uncompressed media file. Line 40 specifies that the frame rate of the first encoded media file is forced to be 24 fps. Line 50 specifies that the first encoded media file is to be generated via an H.264 video codec. Line 60 specifies that the pixel format of the first encoded media file is to be YUV 4:2:0 with progressive frames. Line 70 specifies a particular audio encoder to encode the audio track via advanced audio coding (AAC). Line 80 specifies that the group-of-pictures (GOP) size is 8 frames, where the GOP size species the number of frames between consecutive I-frames. Line 90 moves the metadata associated with the first encoded media file, also referred to herein as the movie atom or MOOV atom, from the end of the file to the beginning of the file. Line 100 specifies the name of the output file as an MPEG-4 container, also referred to herein as an MP4 container. As shown, the filename of the output file is of the form output.mp4.

The resulting first encoded media file includes H.264 encoded video in an MPEG-4 container with one I-frame at every 8 frames, a frame rate of 24 fps, and AAC encoded audio. The color representation of the pixels is YUV 4:2:0. Forcing the MOOV atom to be placed at the start of the MP4 container results in faster load times for the first encoded media file. This first encoded media file is generally compatible with Safari, Internet Explorer and Edge web browsers. In some embodiments, Internet Explorer and Edge may require a maximum GOP size of 8 for frame-accurate navigation, while Safari may require a maximum GOP size of 48 for frame-accurate navigation. In such embodiments, a first encoded media file with a GOP size of 8 may be compatible with all three of these web browsers.

The multi-pass encoding application 230 then encodes the first encoded media file via a two-pass operation to generate a second encoded media file. Some web browsers, such as Chrome, are not generally capable of frame-accurate navigation of H.264 encoded media files. To accommodate such web browsers the first encoded media file is encoded into a second encoded media file that includes VP9-encoded video in a WebM container. The second encoded media file is compatible with frame-accurate playback and navigation via a second set of web browsers, such as Chrome. To achieve frame-accurate playback and navigation, the second encoded media file is encoded according to a second set of encoding parameters. Like the first set of encoding parameters, the second set of encoding parameters is selected to generate a second encoded media file that includes a sufficient number of I-frames for frame-accuracy, while maintaining an acceptable level of visual quality and data transfer speed. Further, the second set of encoding parameters is selected to generate a second encoded media file that has a constant frame rate. In some embodiments, the second encoded media file may be generated by invoking the commands shown below:

```
10      ffmpeg \
20          -i <output.mp4> \
30          -passlogfile <passlog> \
40          -vcodec libvpx-vp9 \
50          -pass 1 \
60          -b:v 1.5M \
70          -speed 4 \
80          -tile-columns 6 \
90          -frame-parallel 1 \
100         -an \
110         -f webm \
120         /dev/null
130     ffmpeg \
140         -i <output.mp4> \
150         -passlogfile <passlog> \
160         -pass 2 \
170         -b:v 1.5M \
180         -speed 2 \
190         -tile-columns 6 \
200         -frame-parallel 1 \
210         -auto-alt-ref 1 \
220         -lag-in-frames 25 \
230         -acodec libvorbis \
240         <output.webm>
``` where lines 10-120 correspond to the first pass and lines 130-240 correspond to the second pass.

Referring now to the first pass of the two-pass encoding operation, line 10 invokes an MPEG based encoder, such as a variant of the FFmpeg encoder. Line 20 species the file name of the first encoded media file to be encoded into the second encoded media file. Line 30 specifies the file name of the pass log file where statistics computed during the first pass are stored and then later retrieved for use during the second pass. Line 40 specifies that the second encoded media file is to be generated via a VP9 video codec. Line 50 specifies that the current pass is the first pass of the two-pass encoding operation. Line 60 specifies the video bit rate of the second encoded media file with a target bitrate of 1.5 Megabits per second (Mbps). Line 70 specifies that first pass encoding is to be performed at a speed factor of 4. Lines 80 and 90 specify a number of tile columns and frame parallel processing, thereby enabling multi-threaded encoding and decoding of the second encoded media file. Line 100 specifies that audio recording is disabled during the first pass. Line 110 specifies that the second encoded media file is to be within a WebM container. Line 120 specifies that no output media file is generated from the first pass.

Referring now to the second pass of the two-pass encoding operation, line 130 invokes the MPEG based encoder employed during the first pass. The parameters as specified on lines 140-240 of the second pass operate substantially the same as the corresponding parameters as specified on lines 20-120 of the first pass, except as further described below. Lines 150 and 160 specify that the current pass is the second pass of the two-pass encoding operation and uses the pass log file that includes statistics computed during the first pass. Line 180 specifies that second pass encoding is to be performed at a speed factor of 2. Line 210 specifies that use of alternate reference frames are enabled for use during the second pass. Line 220 is a frame lag parameter that specifies that the maximum number of frames to look ahead during encoding is 25 frames. Line 230 specifies that the audio track is to be encoded via a particular Vorbis audio codec. Finally, line 240 specifies the name of the output file as a WebM container. As shown, the filename of the output file is of the form output.webm.

This two-pass encoding technique generates a second encoded media file from the first H.264/MP4 encoded media file generated for the first set of web browsers. The first pass of the two-pass encoding technique performs statistical analysis for frame content, and builds a tile profile to identify regions of detail. The second pass performs the actual video encoding and generates the second VP9/WEBM encoded media file. The second encoded media file has a minimum target bit rate of 1.5 Mbps in order to generate an encoded video without significant compression artifacts. In some embodiments, encoding the second encoded media files at target bit rates lower than 1.5 Mbps may result in certain portions of the video, such as burned in source identifiers and frame numbers associated with a reference movie, to be illegible or otherwise indiscernible. Further, specifying a frame lag parameter of at least 25 frames results in a second encoded media file that includes a sufficient number of I-frames for frame-accurate navigation.

In sum, the multi-pass encoding application 230 performs three passes to encode images from an uncompressed media files into a first encoded media file and a second encoded media file. In a first pass, the multi-pass encoding application 230 retrieves uncompressed image files from an uncompressed media file as input. Optionally, the multi-pass encoding application 230 retrieves associated audio data from an audio input file. The multi-pass encoding application 230 encodes the images from the uncompressed media file and the optional audio input file to generate an H.264/MP4 encoded media file. The filename of the H.264/MP4 encoded media file may have the format output.mp4.

In a second pass, the multi-pass encoding application 230 retrieves the H.264/MP4 encoded media file generated during the first pass as input. The multi-pass encoding application 230 computes playback statistics associated with the H.264/MP4 encoded media file and stores those playback statistics in a passlog file. In a third pass, the multi-pass encoding application 230 retrieves the H.264/MP4 encoded media file generated during the first pass and the passlog file generated during the second pass as input. The multi-pass encoding application 230 encodes the H.264/MP4 encoded media file based on the passlog file to generate an VP9/WEBM encoded media file. The filename of the VP9/WEBM encoded media file may have the format output.webm.

In operation, the content delivery application 232 receives requests for content associated with various media files from client devices 104. In general, the received requests are in the form of uniform resource locators (URLs) issued by a web browser executing on a client device 104. In response to receiving a request for content associated with a particular media file, the content delivery application 232 first determines the type of web browser that issued the request. The content delivery application 232 selects a particular encoded media file based on the type of web browser determined to have issued the request. In some embodiments, the content delivery application 232 transmits a first encoded media file if the web browser issuing the request is a Safari, Internet Explorer, or Edge web browser. Alternatively, the content delivery application 232 transmits a second encoded media file if the web browser issuing the request is a Chrome web browser.

The encoded media file is transmitted within the context of an HTML webpage that includes JavaScript code for calculating frame-accurate time codes. As further described herein, the web browser executing on the client device is thereby enabled to navigate to a particular frame in the encoded media file and step forward and backward one frame at a time.

Figure 3:
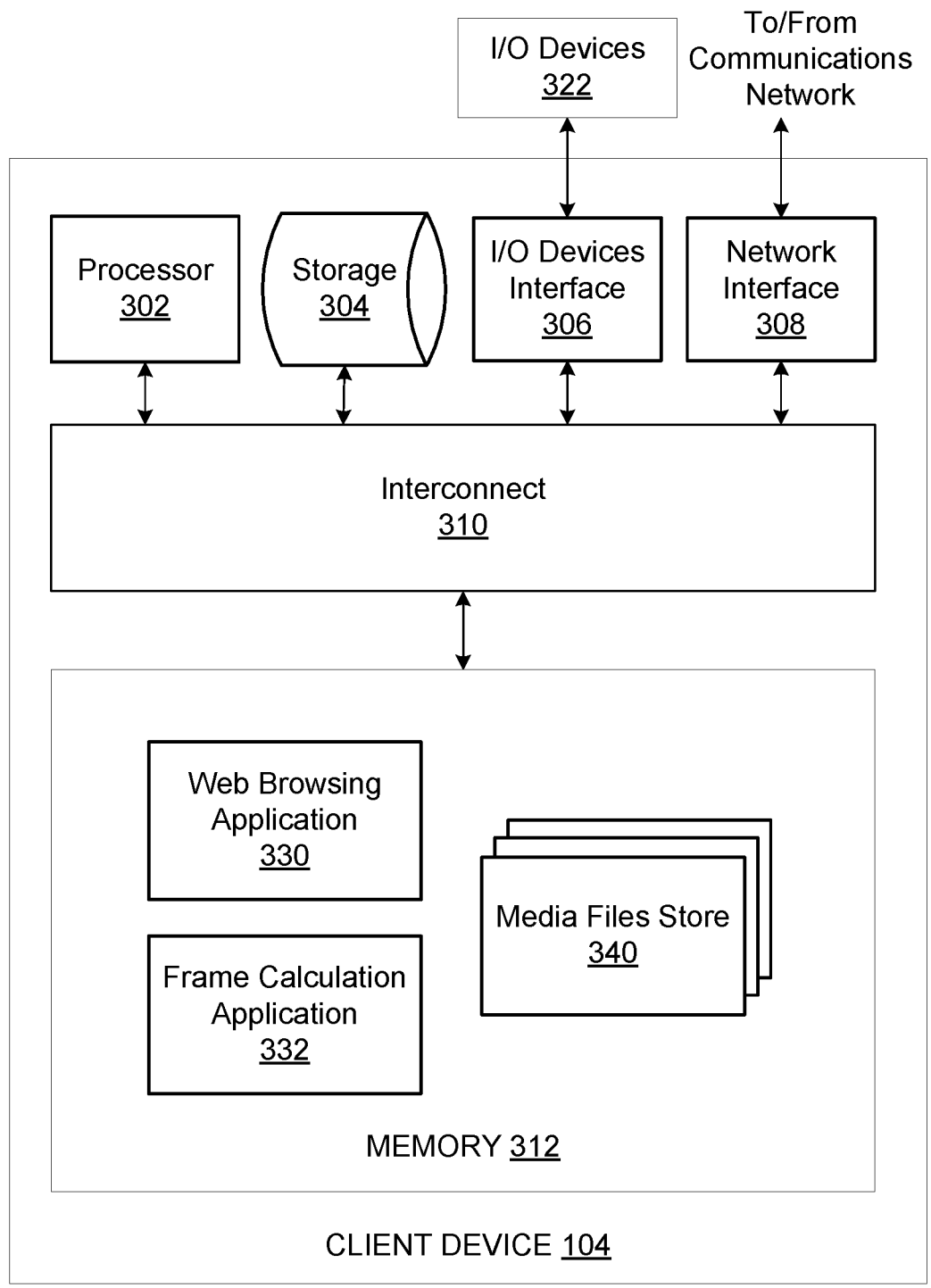
FIG. 3 is a more detailed illustration of the client device of FIG. 1, according to various embodiments of the present invention.

FIG. 3 is a more detailed illustration of the client device 104 of FIG. 1, according to various embodiments of the present invention. As shown, client device 104 includes, without limitation, a processor 302, storage 304, an input/output (I/O) devices interface 306, a network interface 308, an interconnect 310, and a system memory 312. Processor 302, storage 304, input/output (I/O) devices interface 306, network interface 308, interconnect 310, and system memory 312 operate substantially the same as the corresponding elements described in conjunction with FIG. 2, except as further described below.

The processor 302 retrieves and executes programming instructions stored in the system memory 312. Similarly, the processor 302 stores and retrieves application data residing in the system memory 312. The interconnect 310 facilitates transmission, such as of programming instructions and application data, between the processor 302, input/output (I/O) devices interface 306, storage 304, network interface 308, and system memory 312. The I/O devices interface 306 is configured to receive input data from user I/O devices 322. Examples of user I/O devices 322 may include one or more buttons, a keyboard, and a mouse or other pointing device. The I/O devices interface 306 may also include an audio output unit configured to generate an electrical audio output signal, and user I/O devices 322 may further include a speaker configured to generate an acoustic output in response to the electrical audio output signal. Another example of a user I/O device 322 is a display device that generally represents any technically feasible means for generating an image for display. For example, the display device could be a liquid crystal display (LCD) display, CRT display, or DLP display. The display device may be a TV that includes a broadcast or cable tuner for receiving digital or analog television signals.

Processor 302 is included to be representative of a single CPU, multiple CPUs, a single CPU having multiple processing cores, and the like. And the system memory 312 is generally included to be representative of a random access memory. The storage 304 may be a disk drive storage device. Although shown as a single unit, the storage 304 may be a combination of fixed and/or removable storage devices, such as fixed disc drives, floppy disc drives, tape drives, removable memory cards, or optical storage, network attached storage (NAS), or a storage area-network (SAN). Processor 302 communicates to other computing devices and systems via network interface 308, where network interface 308 is configured to transmit and receive data via a communications network.

The system memory 312 includes, without limitation, a web browsing application 330, a frame calculation application 332, and media files store 340. The web browsing application 330, when executed by the processor 302, performs one or more operations associated with accessing web pages for the client device 104 of FIG. 1, as further described herein. The frame calculation application 332, when executed by the processor 302, performs one or more operations associated calculating frame-accurate time codes for the web browsing application 330, as also further described herein. Media files store 340 includes encoded media files, such as reference movies, downloaded from a media content server 102. In general, encoded media files may also be stored in storage 304, and may be transferred between storage 304 and media files store 340. In this manner, a particular encoded media file may be stored only in storage 304, only in media files store 340, or in both storage 304 and media files store 340.

In operation, the web browsing application 330 accesses a web page stored on media content server 102 that includes one or more encoded media files. The web browsing application 330 transmits a request for content associated with a particular media file to the media content server 102 in the form of a URL. In response, to receiving the request for the content associated with the particular media file, the content delivery application 232 selects a particular encoded media file based on the type of web browsing application 330 that issued the request. In some embodiments, the content delivery application 232 transmits a first encoded media file if the web browsing application 330 is a Safari, Internet Explorer, or Edge web browser. Alternatively, the content delivery application 232 transmits a second encoded media file if the web browsing application 330 is a Chrome web browser.

The encoded media file is loaded via the web browsing application 330 by setting a source attribute via the following HTML5 tag:

```
<video id="video" preload="auto" oncontextmenu="return false" width="460" height="312" src="/movie/reference_movie"></video>
``` where "/movie/reference_movie" is the name of the requested encoded media file. The encoded media file is loaded by downloading and storing the complete encoded media file into media files store 340 rather than by a streaming mechanism. The encoded media file is downloaded as a series of blocks which are stored in media files store 340 for a relatively long period of time. The web browsing application 330 can thereby navigate to any frame in the downloaded encoded media file while the encoded media file remains in media files store 340. In some embodiments, encoded media files may be in the form of reference movies, where each reference movie may have a typical duration of a few seconds to a few minutes. Because such reference movies are short relative to full length feature files, large numbers of reference movies may be stored in media files store 340 in their entirety at any given time.

In some embodiments, the playback and navigation functions may be disabled until a sufficient portion of the encoded media file is downloaded by the web browsing application 330 into media files store 340. During download of the encoded media file, the web browsing application 330 may issue a request to the media content server 102 for metadata associated with the encoded media file via a REST API. The web browsing application 330 may parse the received metadata to determine various parameters associated with the encoded media file, including, without limitation, the total frame count and the frame rate of the encoded media file.

When the encoded media file is transmitted by the media content server 102 to the client device 104, the encoded media file is transmitted in the context of an HTML webpage that includes JavaScript code for calculating frame-accurate time codes. The client device 104 receives the JavaScript code from the media content server 102. The client device 104 loads the JavaScript into memory 312 as the frame calculation application 332. Thereafter, when the web browsing application 330 issues a command to navigate to a particular video frame in the encoded media file, the web browsing application 330 transmits a command to the frame calculating application to convert the frame number into a frame-accurate time code. The frame calculation application 332 returns the frame-accurate time code to the web browsing application 330. The web browsing application 330 then navigates to the appropriate place in the encoded media file via the web browsing application 330. Via the frame calculation application 332, frame-accurate time codes are calculated for the purpose of determining the current frame number, seeking to a particular frame, and stepping one frame at a time, as now described.

Assuming a constant frame rate for an encoded media file at 24 fps, the current frame number may be determined as a function of the timecode returned by the HTML5 video API, referred to herein as the currentTime attribute). The value of the returned currentTime attribute is the time elapsed relative to the beginning of the encoded media file. In some embodiments, the returned currentTime attribute may be in between two consecutive video frames of the encoded media file. As a result, the returned currentTime attribute is used to determine the actual frame corresponding to the time code as follows. The actual frame corresponding to returned currentTime timecode may be calculated by rounding the timecode to the nearest whole integer. This calculation may be performed via the getFrame function, as shown in the code segment below:

```
function getFrame( ) {
  let frame = Math.min(Math.floor(video.currentTime * 24.0 + 0.5) + 1.0,
      frame_count);
  return frame;
}
```

In order to navigate to a particular video frame in an encoded media file, the time code is adjusted to avoid navigating to a video frame that is slightly before or after the target video frame. This time code adjustment compensates for time code inaccuracies found in many commercially available web browsing applications 330. The time code adjustment is performed by incrementing the first frame number by a predetermined value associated with an amount of time between two consecutive video frames in the media file to determine the adjusted frame number. In particular, seeking to the timecode corresponding to ⅓ of a frame past the target frame (i.e. 1/72 of a second) results in navigating to the target frame in the most common web browsing applications 330. The time code adjustment for navigating to a particular video frame may be performed via the setFrame function, as shown in the code segment below:

```
function setFrame(targetFrame) {
  let frame = Math.max(target_frame, 1), frame_count);
  video.currentTime = Math.min((frame - 1.0) / 24.0 + 1.0 / 72.0,
      video.duration);
}
```

In order to step forward or backward one frame at a time, care is taken to avoid accumulation of errors that are typical of many web browsing applications. If, for example, one naïve approach for stepping frame-by-frame is to adjust the current time code by adding or subtracting 1/24 of a second to the current time code. While this approach may work for stepping one frame forward or backward, accumulation of errors may result in a step of two frames after the second or third frame step iteration. As a result, frame accurate stepping is performed by first retrieving the current frame number via the getFrame function described herein. The current frame number is then incremented or decremented by one via the stepForward and stepBackward functions, respectively, as shown in the code segment below:

```
function stepForward( ) {
  setFrame(getFrame( ) + 1);
}
function stepBackward( ) {
  setFrame(getFrame( ) - 1);
}
```

It will be appreciated that the core architecture described herein is illustrative and that variations and modifications are possible. Among other things, the multi-pass encoding application 230 and the content delivery application 232 may execute on the same media content server 102 or on different media content servers 102. Further, each of the multi-pass encoding application 230 and the content delivery application 232 may execute on any technically feasible number of media content servers 102 in a distributed computing system in any combination within the scope of the present invention. In addition, each client device 104 may execute any number of web browsing applications 330 of any type in any technically feasible combination. Further, each client device 104 may execute any number of frame calculation applications 332 in conjunction with such web browsing applications 330 in any technically feasible combination. In view of the foregoing, persons of ordinary skill in the art will appreciate that the architecture described in FIGS. 1-3 in no way limits the scope of the present invention.

Figure 4A:
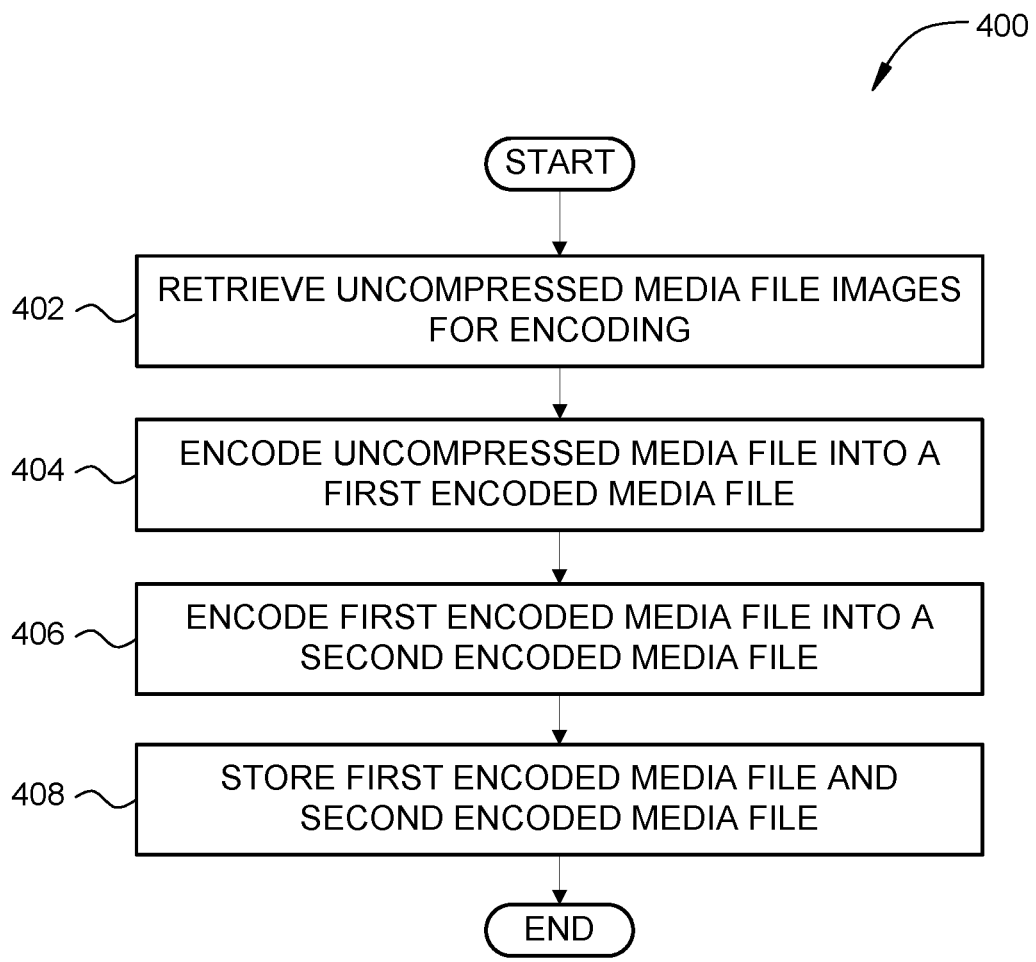
FIG. 4A is a flow diagram of method steps for encoding a set of file-based images, according to various embodiments of the present invention.

FIG. 4A is a flow diagram of method steps for encoding a set of file-based images, according to various embodiments of the present invention. Although the method steps are described in conjunction with the systems of FIGS. 1-3, persons of ordinary skill in the art will understand that any system configured to perform the method steps, in any order, is within the scope of the present invention.

As shown, a method 400 begins at step 402, where a multi-pass encoding application 230 executing on a media content server 102 retrieves a set of file-based images associated with an uncompressed media file for encoding. The uncompressed media file images may be in RGB format. In some embodiments, the uncompressed media file includes a reference movie, where portions of the reference movie may be selected for publicity purposes or identified as needing correction as a result of directorial and technical reviews.

At step 404, the multi-pass encoding application 230 encodes the uncompressed media file into a first encoded media file. The multi-pass encoding application 230 may employ a one-pass encoding process to encode the uncompressed media file into an H.264 encoded media file with an MP4 wrapper. The first encoded media file may be compatible with a first set of web browsing applications 330.

At step 406, the multi-pass encoding application 230 encodes the first encoded media file into a second encoded media file. The multi-pass encoding application 230 may employ a two-pass encoding process to encode the first encoded media file into a VP9 encoded media file with a WebM wrapper. The second encoded media file may be compatible with a second set of web browsing applications 330.

At step 408, the multi-pass encoding application 230 stores the first encoded media file and the second encoded media file. The multi-pass encoding application 230 may store the encoded media files in storage 204, in a media files store 240 residing in memory 212, or in both storage 204 and in the media files store 240. The method 400 then terminates.

Figure 4B:
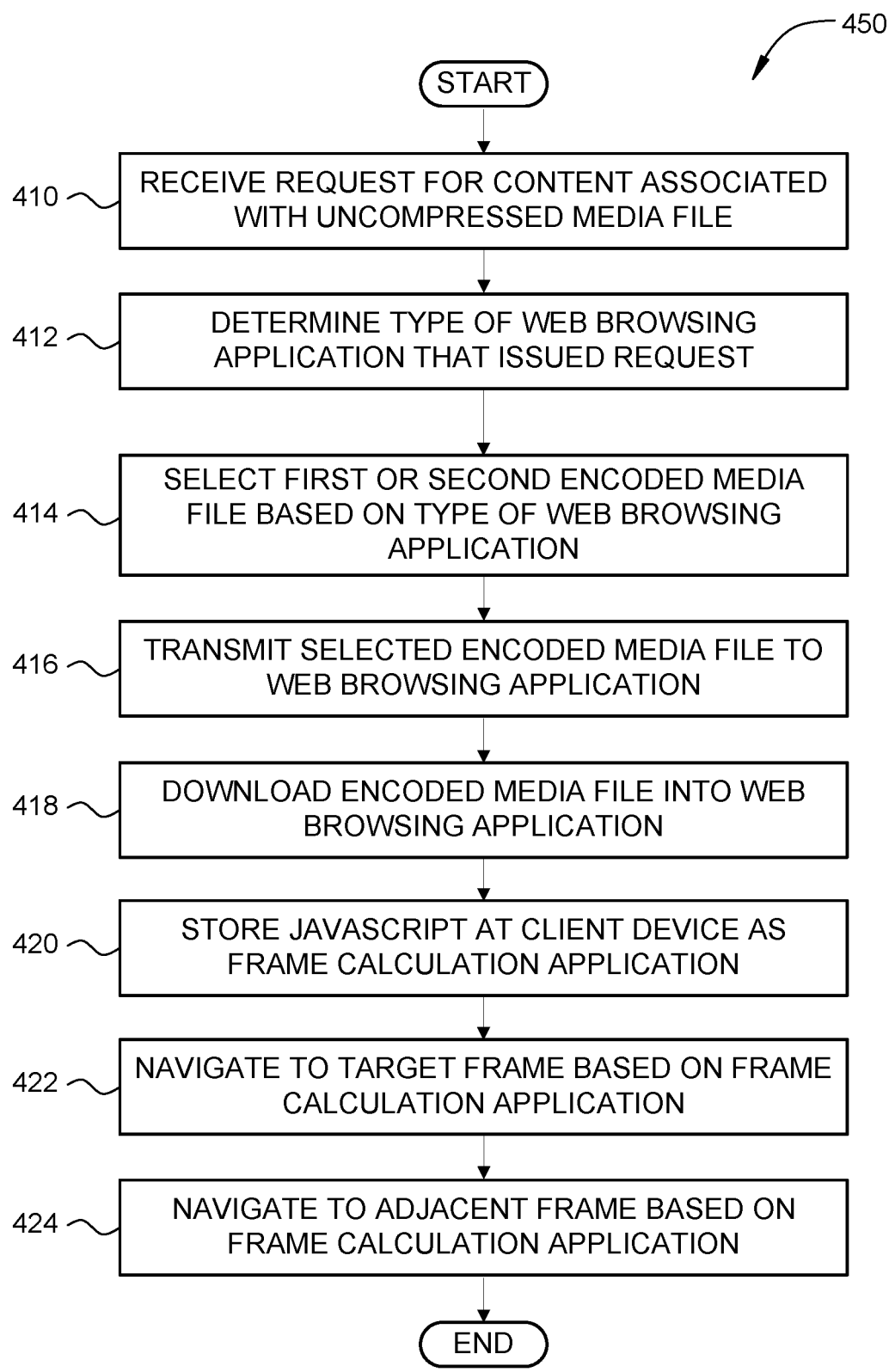
FIG. 4B is a flow diagram of method steps for frame-accurate navigation of a media file via a web browser, according to various embodiments of the present invention.

FIG. 4B is a flow diagram of method steps for frame-accurate navigation of a media file via a web browser, according to various embodiments of the present invention. Although the method steps are described in conjunction with the systems of FIGS. 1-3, persons of ordinary skill in the art will understand that any system configured to perform the method steps, in any order, is within the scope of the present invention.

As shown, a method 450 begins at step 410, where a content delivery application 102 executing on the media content server 102 receives a request for content associated with the uncompressed media file. The content delivery application 102 receives the request from a web browsing application 330 executing on a client device 104. At step 412, the content delivery application 102 determines the type of web browsing application 330 that issued the request. At step 414, the content delivery application 102 selects either the first encoded media file or the second encoded media file based on the type of web browsing application 330 that issued the request. At step 416, the content delivery application 102 transmits the selected encoded media file to the web browsing application 330 on the client device 104. The content delivery application 102 transmits the selected encoded media file in the context of an HTML5 webpage that includes JavaScript code that performs a set of calculations to map between the frame numbers associated with the encoded media file and the timecodes employed by the HTML5 video player JavaScript API.

At step 418, the web browser application 330 downloads the encoded media file as a series of blocks until the entire encoded media file is stored. The web browser application 330 may store the encoded media files in storage 304, in a media files store 340 residing in memory 312, or in both storage 304 and in the media files store 340. At step 420, the web browser application 330 stores the JavaScript code as the frame calculation application 332.

At step 422, the web browser application 330 navigates to a target video frame in the encoded media file. To navigate to a target video frame, the web browser application 330 invokes a setFrame function in the frame calculation application 332 to adjust the frame number of the video frame and then convert the adjusted frame number into an HTML5 compatible time code. The web browser application 330 then navigates to the target video frame via the HTML5 compatible time code.

At step 424, the web browser application 330 steps to an adjacent frame in the encoded media file. To step to an adjacent video frame, the web browser application 330 invokes a stepForward function in the frame calculation application 332 to go forward one frame or a stepBackward function in the frame calculation application 332 to go backward one frame. The stepForward function invokes a getFrame function in the frame calculation application 332 to receive the value of the current frame number. The stepForward function then increments the value received from the getFrame function by one and invokes the setFrame function to convert the incremented frame number into an HTML5 compatible time code. Similarly, the stepBackward function invokes a getFrame function in the frame calculation application 332 to receive the value of the current frame number. The stepBackward function then decrements the value received from the getFrame function by one and invokes the setFrame function to convert the decremented frame number into an HTML5 compatible time code. After invoking either the stepForward or the stepBackward function, the web browser application 330 navigates to the adjacent video frame via the HTML5 compatible time code. The method 450 then terminates.

In sum, video frames associated with a media content file can be navigated to and selected in a frame-accurate manner via an HTML5 video player. In a first aspect, a set of file-based images associated with an uncompressed media file are encoded via a particular set of constrained parameters to generate a first encoded media file that is navigable in a frame-accurate manner on via a first set of web browsers. The first encoded media file is encoded via another particular set of constrained parameters to generate a second encoded media file that is navigable in a frame-accurate manner on via a second set of web browsers. In a second aspect, an HTML5 webpage including JavaScript code is loaded when a web browser accesses a web page that includes encoded reference movies. The JavaScript performs a set of calculations that maps between the frame numbers associated with the encoded media file and the timecodes employed by the HTML5 video player JavaScript API. Rather than simply calculating a "frames per time unit" value, the JavaScript applies correctional offsets to correctly map between reference movie frame numbers and HTML5 timecodes. These correctional offsets compensate for the inaccuracy of existing HTML5 video implementations. Additionally, the video timecode is reset after every start, stop, and seek operation invoked by the user in order to keep seeking accurate.

At least one advantage of the disclosed techniques is that they enable reference movies to be accessed via standard web browsers in a frame-accurate manner. Among other things, with the disclosed techniques, users can navigate to a specific frame in a reference movie and can step forward or backward one frame at a time until a particular frame of interest is identified. As a result, portions of a reference movie can be identified more easily and accurately for publicity purposes or in order to correct directorial or technical issues.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for navigating a media file, the method comprising:
   incrementing a first value corresponding to a first frame number of a target video frame of the media file by a predetermined value associated with an amount of time between two consecutive video frames in the media file to determine a second value associated with the target video frame;
   converting the second value into a first time code; and
   accessing the target video frame based on the first time code.

2. The computer-implemented method of claim 1, further comprising:
   receiving a command to navigate to a new target video frame that is one frame after the target video frame;
   incrementing a third frame number associated with the target video frame by one to determine a fourth frame number;
   converting the fourth frame number into a second time code; and
   accessing the new target video frame based on the second time code.

3. The computer-implemented method of claim 2, further comprising determining the target video frame by rounding a third time code associated with the target video frame to a nearest whole integer.

4. The computer-implemented method of claim 1, further comprising:
   receiving a command to navigate to a new target video frame that is one frame before the target video frame;
   decrementing a third frame number associated with the target video frame by one to determine a fourth frame number;
   converting the fourth frame number into a second time code; and
   accessing the new target video frame based on the second time code.

5. The computer-implemented method of claim 1, wherein the predetermined value corresponds to one third of the amount of time between two consecutive video frames in the media file.

6. The computer-implemented method of claim 1, wherein the predetermined value corresponds to $\frac{1}{72}$ of a second.

7. The computer-implemented method of claim 1, further comprising:
   downloading the media file and a script from a server, wherein the incrementing and converting steps are performed by the script.

8. The computer-implemented method of claim 1, wherein the media file comprises one of a H.264 encoded media file or a VP9 encoded media file.

9. The computer-implemented method of claim 1, wherein the media file is encoded at a fixed frame rate.

10. One or more non-transitory computer-readable storage media including instructions that, when executed by one or more processing units, cause the one or more processing units to perform steps for navigating a media file, the steps comprising:
    incrementing a first value corresponding to a first frame number of a target video frame of the media file by a predetermined value associated with an amount of time between two consecutive video frames in the media file to determine a second value associated with the target video frame;

converting the second value into a first time code; and accessing the target video frame based on the first time code.

11. The one or more non-transitory computer-readable storage media of claim 10, wherein the instructions, when executed by the one or more processing units, further cause the one or more processing units to perform steps comprising:

receiving a command to navigate to a new target video frame that is one frame after the target video frame;

incrementing a third frame number associated with the target video frame by one to determine a fourth frame number;

converting the fourth frame number into a second time code; and accessing the new target video frame based on the second time code.

12. The one or more non-transitory computer-readable storage media of claim 11, wherein the instructions, when executed by the one or more processing units, further cause the one or more processing units to perform steps comprising:

determining the target video frame by rounding a third time code that is returned by a video application programming interface (API) to a nearest whole integer.

13. The one or more non-transitory computer-readable storage media of claim 11, wherein the instructions, when executed by the one or more processing units, further cause the one or more processing units to perform steps comprising:

determining the target video frame by rounding a third time code to a nearest whole integer, wherein the third time code is associated with an elapsed time relative to a beginning of the media file.

14. The one or more non-transitory computer-readable storage media of claim 10, wherein the instructions, when executed by the one or more processing units, further cause the one or more processing units to perform steps comprising:

receiving a command to navigate to a new target video frame that is one frame before the target video frame;

decrementing a third frame number associated with the target video frame by one to determine a fourth frame number;

converting the fourth frame number into a second time code; and accessing the new target video frame based on the second time code.

15. The one or more non-transitory computer-readable storage media of claim 10, wherein the predetermined value corresponds to one third of the amount of time between two consecutive video frames in the media file.

16. The one or more non-transitory computer-readable storage media of claim 10, wherein the predetermined value corresponds to 1/72 of a second.

17. The one or more non-transitory computer-readable storage media of claim 10, wherein the instructions, when executed by the one or more processing units, further cause the one or more processing units to perform steps comprising:

downloading the media file and a script from a server, wherein the incrementing and converting steps are performed by the script.

18. The one or more non-transitory computer-readable storage media of claim 10, wherein the media file is encoded at a fixed frame rate.

19. A system, comprising:

one or more memories storing instructions; and one or more processors that are coupled to the one or more memories and, when executing the instructions, are configured to:

increment a first value corresponding to a first frame number of a target video frame of a media file by a predetermined value associated with an amount of time between two consecutive video frames in the media file to determine a second value associated with the target video frame, convert the second value into a first time code, and access the target video frame based on the first time code.

20. The system of claim 19, wherein the one or more processors, when executing the instructions, are further configured to:

receive a command to navigate to a new target video frame that is either one frame before or one frame after the target video frame;

increment or decrement a third frame number associated with the target video frame by one to determine a fourth frame number;

convert the fourth frameinto a second time code; and access the new target video frame based on the second time code.

* * * * *

UNITED STATES PATENT AND TRADEMARK OFFICE
CERTIFICATE OF CORRECTION

| | | |
|---|---|---|
| PATENT NO. | : 11,722,542 B2 | Page 1 of 1 |
| APPLICATION NO. | : 17/468097 | |
| DATED | : August 8, 2023 | |
| INVENTOR(S) | : Colin Smith, Scott A. Erickson and Giovanni Colombo | |

It is certified that error appears in the above-identified patent and that said Letters Patent is hereby corrected as shown below:

In the Claims

Column 18, Claim 20, Line 45, please delete "frameinto" and insert --frame number into--.

Signed and Sealed this
Third Day of October, 2023

*Katherine Kelly Vidal*

Katherine Kelly Vidal
*Director of the United States Patent and Trademark Office*